(12) United States Patent
Chang

(10) Patent No.: US 6,914,685 B2
(45) Date of Patent: Jul. 5, 2005

(54) APPARATUS AND METHOD FOR MEASURING THE SHAPE OF A THREE DIMENSIONAL OBJECT USING PROJECTED MULTI-STRIPE PATTERNS

(75) Inventor: Min-Ho Chang, Seoul (KR)

(73) Assignee: Solutionix Co., Ltd., Seoul (KR)

(*) Notice: Subject to any disclaimer, the term of this patent is extended or adjusted under 35 U.S.C. 154(b) by 0 days.

(21) Appl. No.: 10/661,007

(22) Filed: Sep. 11, 2003

(65) Prior Publication Data

US 2004/0126006 A1 Jul. 1, 2004

Related U.S. Application Data

(63) Continuation of application No. PCT/KR02/00393, filed on Mar. 9, 2002.

(30) Foreign Application Priority Data

Mar. 13, 2001 (KR) .................................. 10-2001-0012806
Feb. 28, 2002 (KR) .................................. 10-2002-0010839

(51) Int. Cl.⁷ .............................................. G01B 11/24
(52) U.S. Cl. ...................................................... 356/610
(58) Field of Search ......................................... 356/610

(56) References Cited

U.S. PATENT DOCUMENTS 4,187,011 A * 2/1980 Di Matteo et al. .......... 356/610
4,269,513 A * 5/1981 DiMatteo et al. ........... 356/610

FOREIGN PATENT DOCUMENTS

| JP | 04-052509 A | 2/1992 |
| JP | 05-196436 | 6/1993 |
| JP | 10-122834 | 5/1998 |
| JP | 10-197225 | 7/1998 |
| KR | 2001-0009721 | 2/2001 |

* cited by examiner

Primary Examiner—Richard A. Rosenberger
(74) Attorney, Agent, or Firm—Knobbe Martens Olson & Bear LLP.

(57) ABSTRACT

A three-dimensional measurement apparatus using multiple striped patterns and a method thereof is disclosed to take a three-dimensional measurement by projecting and transporting the multiple striped patterns having a plurality of stripes, not a single striped pattern that is projected once to the entire area of an object, according to a striped pattern shape, thereby making a faster and more precise three-dimensional measurement, cutting down the entire size, weight and manufacturing cost of the relevant three-dimensional measurement apparatus and, at the same time, reducing measurement time.

17 Claims, 14 Drawing Sheets

(A)

(B)

(C)

(D)

$i^{th}$ IMAGE $i+1^{th}$ IMAGE

APPARATUS AND METHOD FOR MEASURING THE SHAPE OF A THREE DIMENSIONAL OBJECT USING PROJECTED MULTI-STRIPE PATTERNS

RELATED APPLICATIONS

This application is a continuation application, and claims the benefit under 35 U.S.C. §§120 and 365 of PCT Application No. PCT/KR02/00393 filed on Mar. 9, 2002 and published on Sep. 26, 2002, in English, which is hereby incorporated by reference herein.

BACKGROUND OF THE INVENTION

1. Field of the Invention

The present invention relates to a three-dimensional measurement apparatus using a multiple striped pattern and a method thereof, and more particularly to a three-dimensional measurement apparatus using multiple striped patterns that projects a pattern film comprising multiple striped patterns, which means that a plurality of striped patterns are projected at one photographing shot for the three-dimensional measurement, to an object to be measured (hereinafter referred to as an object) and then photograph it, thereby making it possible to take a swift and precise three-dimensional measurement.

2. Description of the Related Technology

In general, one of widely used three-dimensional measurement methods is to measure a relevant object with a combination of a camera and a light emitting projector (laser, light or the like), and the other method is a stereo vision using only a plurality of cameras as photographing means without using a projector. According to Korea patent No. 10-1999-0028254, not a single point, but a striped pattern is projected or spatially encoded light is projected with a LCD projector, so that rather many points of coordinates are obtained for measurement of an object at a single photographing shot.

In other words, according to the striped pattern projecting method, a plurality of striped patterns are projected and an image projected with relevant striped patterns is photographed for measurement of a three-dimensional shape. At this time, a moiré pattern or an optical triangular principle is used for operation to finally obtain three-dimensional shape information.

SUMMARY OF CERTAIN INVENTIVE ASPECTS OF THE INVENTION

One aspect of the invention provides a three-dimensional measurement apparatus using a multiple striped pattern and a method thereof that can take a swift, precise three-dimensional measurement by projecting a multiple striped pattern to an object, that is, projecting a plurality of striped patterns to the entire object at one time, instead of a single striped pattern only once to the entire object, and photographing it.

Another aspect of the invention provides a three-dimensional measurement apparatus that can make a three-dimensional measurement with multiple striped patterns, thereby reducing the size, weight and manufacturing cost of the apparatus and the measurement time of a three-dimensional image.

Another aspect of the invention provides a three-dimensional measurement apparatus projecting multiple striped patterns on an object for measurement of a three-dimensionally shaped object, the apparatus including: a projecting section for projecting multiple striped patterns on the objection for measurement to provide a correspondence in the three-dimensional measurement; a pattern film constructed with a plurality of short, horizontally striped pattern sections to provide multiple striped patterns that will be projected by the projecting section; a transporting section for moving the pattern film along a striped pattern direction to the projecting section; a photographing section for photographing an object with the multiple striped patterns projected by the projecting section at a predetermined time interval; a control unit for controlling the projecting, transporting and photographing section; and an operational unit for presuming an image that may be photographed with a single striped pattern with all the images photographed with the photographing section to obtain three-dimensional shape information.

At this time, the operational unit finds out borders between respective striped pattern sections of all the photographed images to classify each image into pieces, selects some image pieces relevant to identical striped pattern sections among the classified image pieces and combines the selectively classified image pieces to presume an image that may be photographed by projecting a single striped pattern. The photographing section is positioned at the top or bottom of the projecting section, and an optical axis of the projecting section and that of the photographing section are positioned on a plane perpendicular to multiple striped patterns of the pattern film. At this time, a straight line connecting the center of the projecting section and that of the photographing section is positioned in parallel to a plane where the pattern film is positioned.

In the aforementioned three-dimensional measurement apparatus using multiple striped patterns, the width of one section of short striped patterns forming the pattern film is smaller than an entire projecting area of an object, but greater than the transportation distance of the pattern film to be transported by the transporting section (the pattern film transporting speed of the transporting section x the continuous photographing time interval of the photographing section) and a resultant value obtained by adding a transportation distance of the pattern film and width of a section where a motion blurring phenomenon happens (a shutter speed of the photographing section x a transportation speed of the pattern film).

Another aspect of the invention provides a three-dimensional measurement method for measuring a three-dimensional shape of an image by projecting striped patterns to an object, the method including: transporting a pattern film consisting of a plurality of short striped pattern sections along the striped pattern direction; projecting the pattern film transported along the striped pattern direction to the object to photograph at a predetermined time interval the object onto which the multiple striped patterns have been projected; and resuming images that may be photographed by projecting a single striped pattern out of all the images photographed at the predetermined time interval to thereby obtain three-dimensional shape information of the object.

At this time, the presuming images that may be photographed by projecting a single striped pattern with all the photographed images to obtain a three-dimensional shape information on an object further includes: finding out borders between respective striped pattern sections of all the photographed images to classify each image into pieces; selecting some image pieces relevant to identical striped pattern sections among the classified image pieces; and combining the selectively classified image pieces to presume an image that may be photographed by projecting a single striped pattern.

More specifically, the finding out borders between respective striped pattern sections out of all the photographed images to classify the image into pieces further includes: finding out borders between striped pattern sections with all the photographed images by using physical figures or respectively comparing brightness and color data of one area with those of the following area while being transported in perpendicular to the striped pattern of a reference image chosen among all the images sequentially photographed at a predetermined time interval. The combining the selectively classified image pieces to presume an image that may be photographed by projecting a single striped pattern that all the image pieces are combined at a predetermined image piece with coordinates of respective image pieces being kept identical. However, in order to eliminate the motion blurring phenomenon at the areas folded between respective images, the areas relevant to the center of respective image pieces, not the edge thereof, is taken for combination.

BRIEF DESCRIPTION OF THE DRAWINGS

Aspects of the invention will become apparent from the following description of preferred embodiments with reference to the accompanying drawings in which.

DETAILED DESCRIPTION OF CERTAIN EMBODIMENTS OF THE INVENTION

Figure 1:
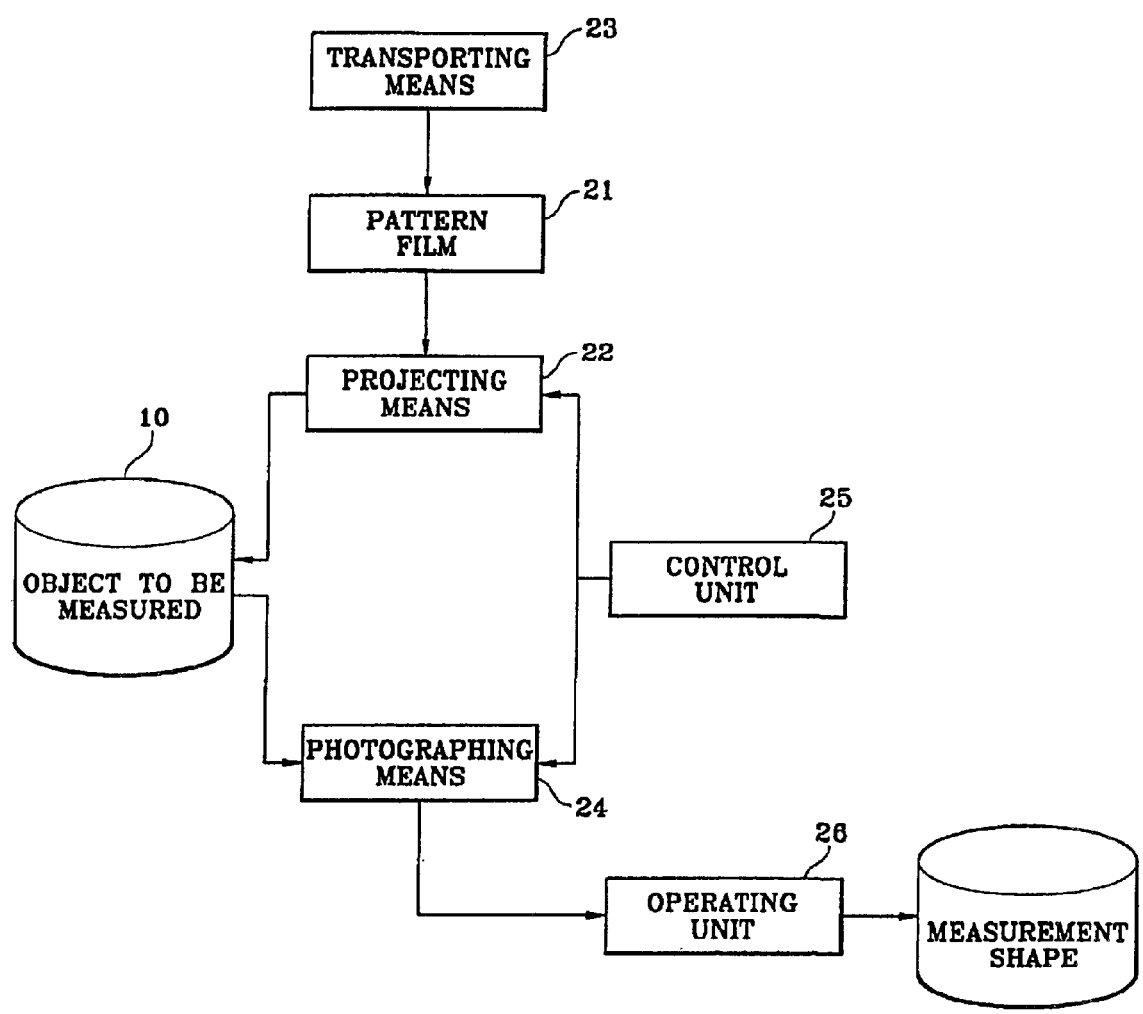
FIG. 1 is a block diagram illustrating a structure of a typical three-dimensional measurement apparatus.

A typical three-dimensional measurement apparatus is generally constructed, as shown in FIG. 1, with an object 10, a pattern film 21 consisting of a plurality of striped patterns to be projected on the object 10, projecting means 22 for projecting the striped patterns on the object 10, transporting means 23 for transporting the pattern film 21 to the relevant projecting means 22, photographing means 24 made up of a plurality of cameras to photograph an image projected on the object 10, a control unit 25 for controlling operations of the transporting means 23, projecting means 22 and photographing means 24 and an operating unit 26 for obtaining three-dimensional shape information by analysis of the image photographed by the photographing means 24. The transporting means 23 is controlled to transport the pattern film 21 to the projecting means 22 for repeated projections and photographs, such that three-dimensional information can be obtained with the image projected and photographed with multiple striped patterns.

At this time, by applying a principle similar to that of a slide projector constructed with a light source, a film and a lens, the projecting means 22 projects a series of striped patterns of the pattern film 21 transported by the transporting means 23. The relevant transporting means 23 mechanically transports and positions the plurality of striped patterns of the pattern film 21 between the light source and a lens of the projecting means 22.

Furthermore, the pattern film 21 means a film having horizontally printed multiple striped patterns. The pattern film 21 can also be made by punching relevant patterns in a glass or metal plate besides a film. In the present invention, the shape as such is generally called the pattern film 21.

Meanwhile, in the prior art, instead of a slide projector mechanically transporting the pattern film 21, an electronic LCD projector may be used to project multiple striped patterns. However, there has been a problem in the electronic LCD projector in that, since there exists a section where light is not projected between LCD devices forming the relevant LCD projecting means, it is not easy to control sections of striped patterns and jitter noise of electric signals causing shakes in the projected image, thereby resulting in difficulties in obtaining precise three-dimensional information. Therefore, the mechanical projecting apparatus has been mainly in use.

Besides, if the projecting means 22 is made of a mechanical projecting apparatus, the transporting means 23 that transports the pattern film 21 is also constructed with a mechanical transporting apparatus. At this time, an internal transporting method used for transporting the pattern film 21 is classified into linear and rotational transportations. The linear transportation method has been mainly used for the typical transporting means 23, where the pattern film 21 is fixed on a transportation block that moves on a one-axis rail, and a motor is used to transport the transportation block to its axial direction, thereby moving the pattern film 21 fixed at the relevant transportation block to the axial direction.

Furthermore, according to the rotational method, the pattern film 21 is mounted on a rotary wheel and a light source is fixed at the center of the rotation, so that the rotary wheel is being rotated to project patterns. However, there are problems in the rotational method in that the pattern film 21 has a curved plane to make a focal point inaccurate and the transporting apparatus gets larger. Therefore, the rotary method has not been in general use.

Figure 2:
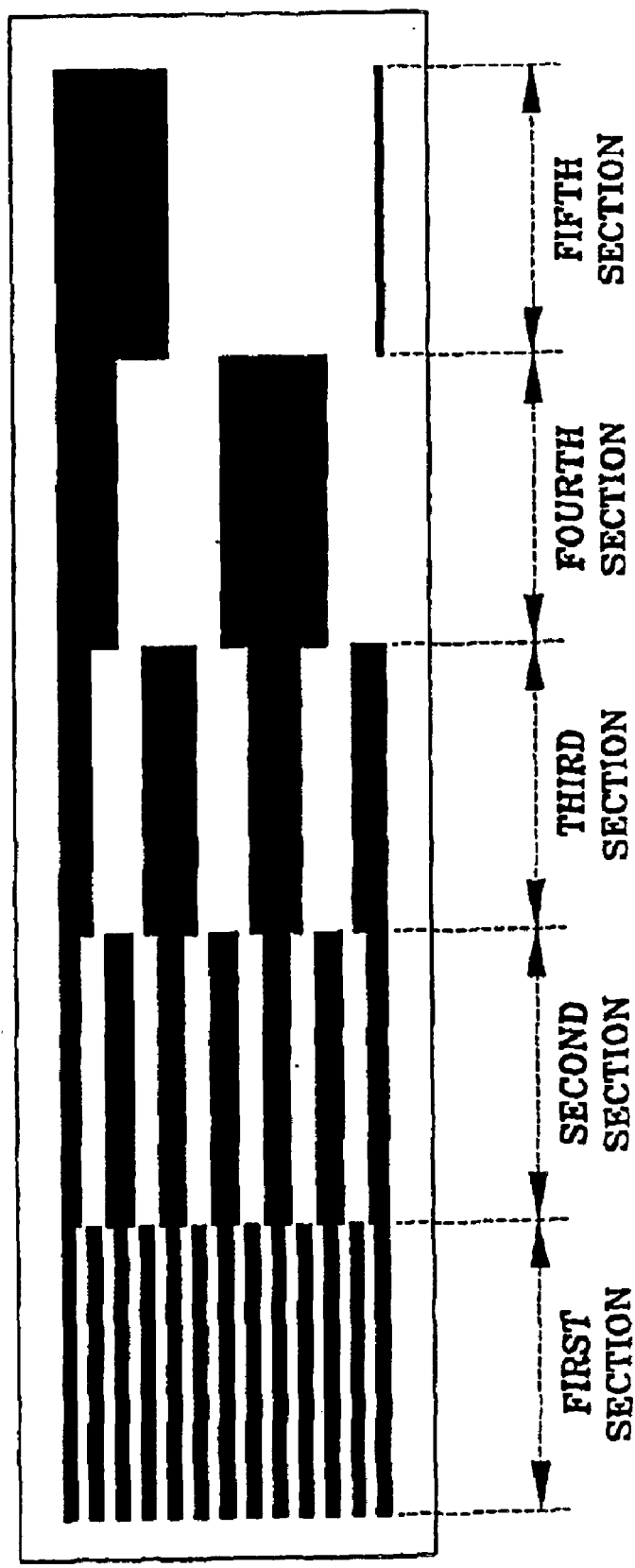
FIG. 2 illustrates a pattern film made up of a single stripe pattern used for a typical three-dimensional measurement apparatus.
Figure 3:
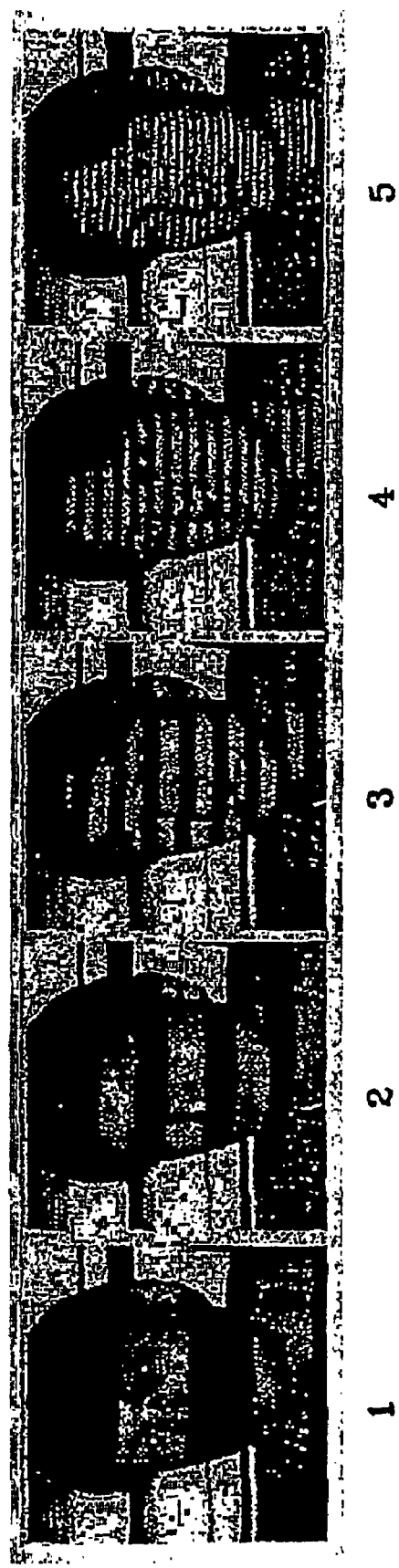
FIG. 3 illustrates images photographed by transporting and projecting a pattern film having the single striped pattern shown in FIG. 2.

Also, the pattern film 21 used in the general three-dimensional apparatus is made up of a plurality of sections (5 sections) as shown in FIG. 2. Each of all the sections has its own striped pattern in parallel. In the above three-dimensional measurement apparatus, the pattern film 21 is transported in parallel to the striped pattern by the transporting means 23 to project the striped pattern, which then photographs the projected object 10. FIG. 3 illustrates images photographed by transporting the pattern film 21 shown in FIG. 2 and projecting it to the object 10 at each section. At this time, only one striped pattern to be projected for a single photograph of a three-dimensional measurement like the one striped pattern of each section shown in FIG. 2 will be referred to as a 'single striped pattern.'

In the above three-dimensional measurement apparatus, the single striped pattern of each section is projected only once to the whole object 10 for a photographing shot. At this time, the pattern film 21 of the three-dimensional measurement apparatus has a horizontally long single striped pattern at each section. For instance, if the pattern film 21 has 10 single striped pattern sections each of which has a single striped pattern of 35 mm, the pattern film 21 needs to have the length of 350 mm. However, there are a few disadvantages in such a long pattern film 21 that will be listed below.

In other words, as described above, in the three-dimensional measurement apparatus using a single striped pattern, transportation direction and parallelism of the pattern film 21 are regarded very important for a high measurement precision. As the pattern film 21 gets longer, it gets more difficult to keep a high parallelism of the single striped pattern relative to a transportation direction. As the pattern film 21 gets longer, the measurement apparatus and the measurement time get bigger and longer as a whole.

Hereinafter, other characteristics and advantages of the present invention will be apparently described according to embodiments with reference to accompanying drawings.

Figure 4:
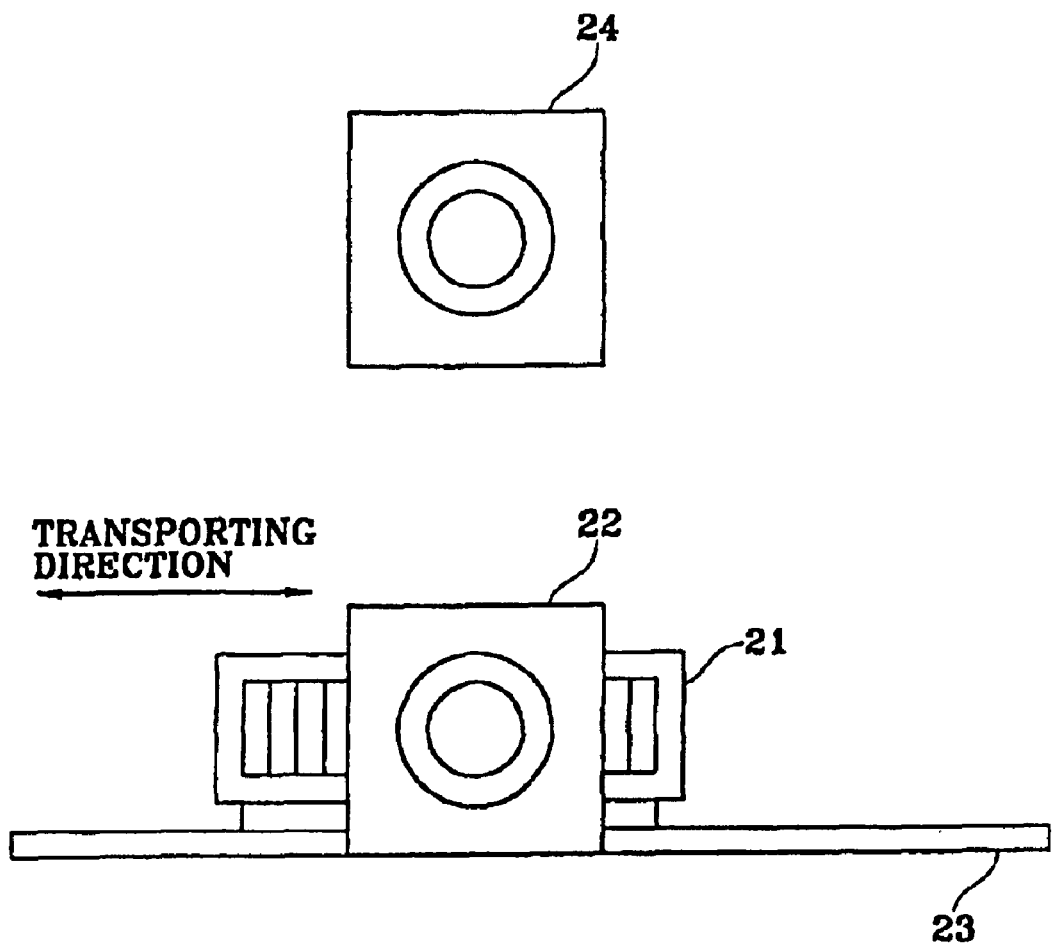
FIG. 4 illustrates a spatial arrangement state of key parts to construct a three-dimensional measurement apparatus using the multiple striped patterns according to various embodiments of the present invention.
Figure 5:
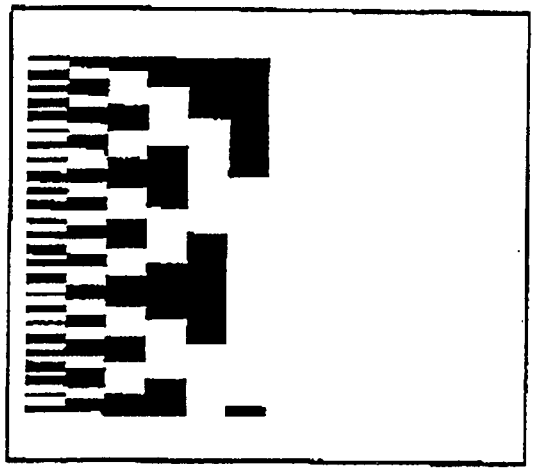
FIG. 5 illustrates a pattern film made up of multiple striped patterns to be used with a three-dimensional measurement apparatus according to various embodiments of the present invention.
Figure 5:
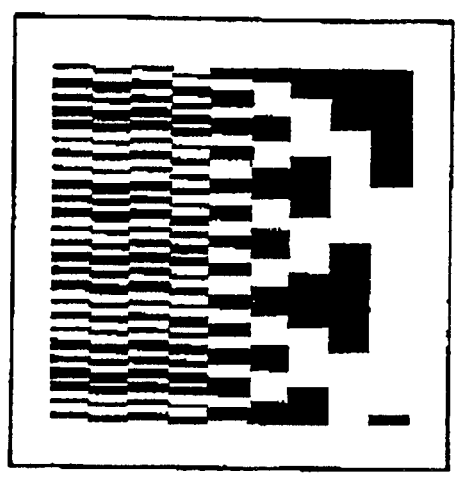
Figure 5:
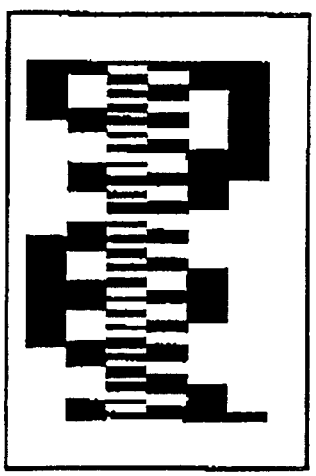
Figure 5:
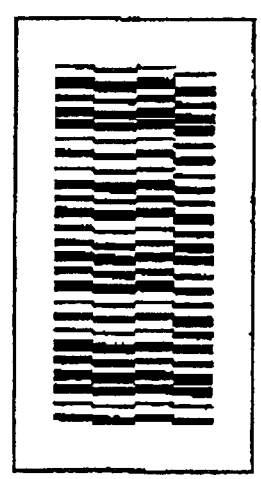

First of all, FIG. 4 is the spatial arrangement of key parts to construct a three-dimensional measurement apparatus using multiple striped patterns of the present invention. At this time, the pattern film 21 has a plurality of horizontal short stripes as shown in FIG. 5. The pattern film 21 is transported along with the length of the relevant striped patterns (horizontally), and the camera of photographing means 24 is positioned over the projector 22.

However, the arrangement of the three-dimensional measurement apparatus shown in FIG. 4 is illustrated for conveniences of descriptions. The camera of the photographing means 24 can also be positioned under, over, at the left or right of a projector 22. If the multiple striped patterns of the pattern film are made vertical, the relevant pattern film 21 is transported to the vertical direction.

Also, the three-dimensional measurement apparatus using the multiple striped patterns to be described in the present invention has the same conceptual structure as the typical one shown in FIG. 1, so that like reference numerals are used for designation of equivalent parts for simplicity of illustration and explanation. Operations of the parts will be described according to the present invention.

The relevant pattern film 21 has the same shapes shown in FIG. 5, with a smaller striped pattern section than those of the typical pattern film 21. At this time, like the short striped patterns shown in FIG. 5, the striped patterns projected with a plurality of striped patterns at one photographing shot will be referred to as 'multiple striped patterns' for the convenience of descriptions below.

The relevant projecting means 22 projects the multiple striped patterns onto an object 10 at one photographing shot to provide the correspondence of the three-dimensional measurement. The relevant transporting means 23 transports the pattern film 21 to the projecting means 22 horizontally or vertically according to the shape of the striped patterns, and the photographing means 24 photographs the object 10, to which the multiple striped patterns are projected, at a predetermined time interval to transport to the operating unit 26.

Furthermore, the control unit 25 controls operations of the projecting means 22, transporting means 23 and photographing means 24. The relevant operating unit 26 presumes an image projected and photographed with a single striped pattern shown in FIG. 3. and combined the presumed image to obtain three-dimensional shape information on the object 10.

Figure 6:
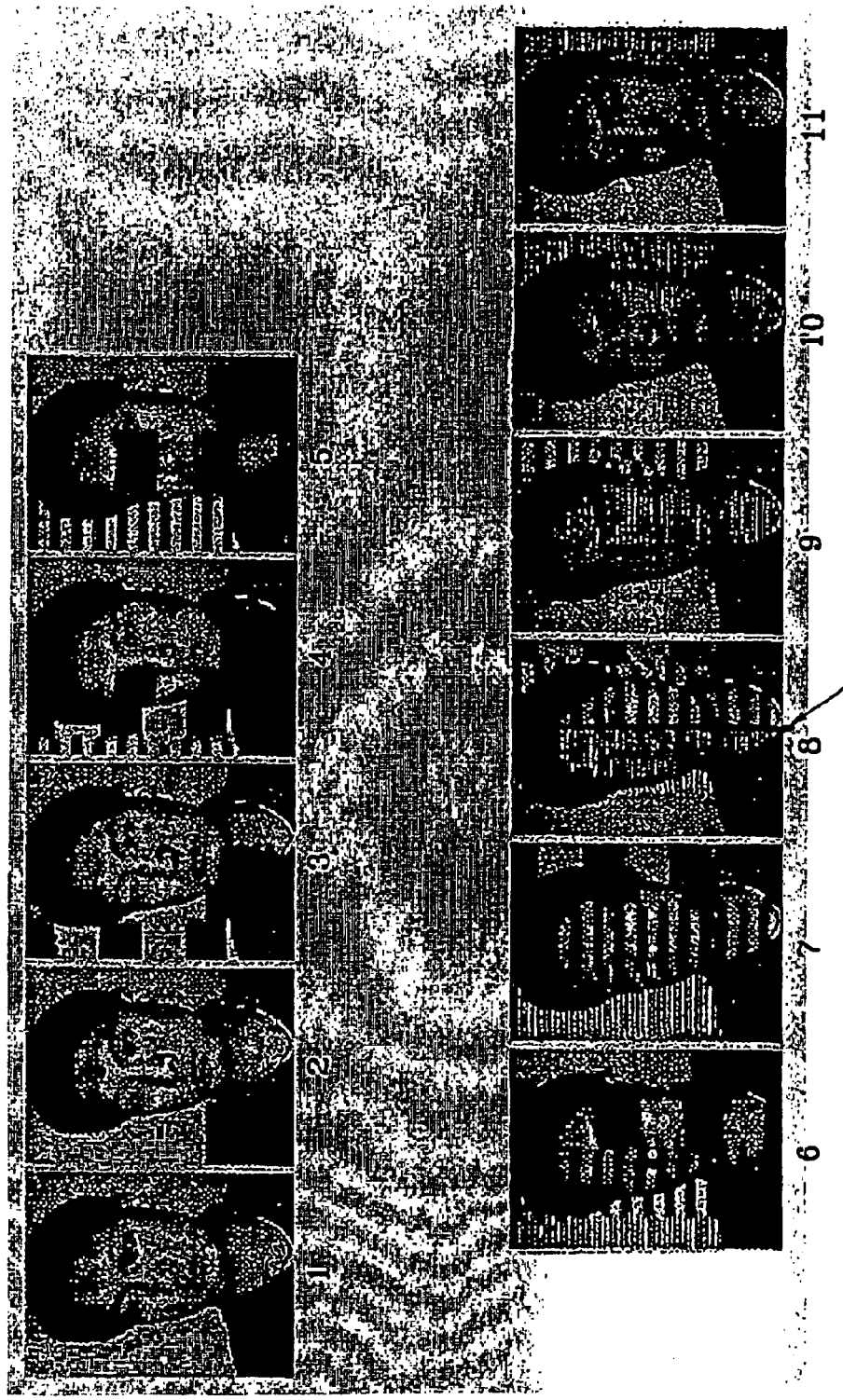
FIG. 6 illustrates images photographed by transporting and projecting a pattern film of multiple striped patterns shown in FIG. 5 onto an object.

In the three-dimensional measurement apparatus using the multiple striped patterns thus constructed, the pattern film 21 having the aforementioned multiple striped pattern section is transported horizontally or vertically according to the shape of the striped patterns with the transporting means 23 and projected to the object 10. The object 10 to which the relevant striped patterns has been projected is photographed. FIG. 6 is an image photographed by transporting and projecting the pattern film 21 having a multiple striped pattern section shown in FIG. 5 to the object 10.

At this time, as shown in the image shown in FIG. 6, differently from the image photographed with the typical three-dimensional measurement apparatus shown in FIG. 3 (that is, an image photographed by projecting the long, horizontal multiple striped patterns), the multiple striped patterns having several sections are simultaneously projected in one image. When all the continuously photographed images are compared to find that the object 10, an area to be measured, is projected more than once while the respective sections of the pattern film 21 are transported from the left to the right. All the respective images are combined to presume an image photographed by projecting a single striped pattern as shown in FIG. 3.

Moreover, if an image is photographed by projecting the respective intervals of the multiple striped patterns of the pattern film 21 to the object 10, a measurement area, more than once while they are transported from the left to the right, the width of each section of the multiple striped patterns forming the relevant pattern film 21 should be determined to be smaller than the whole projecting area of the object 10. Besides, the transporting speed (v) of the pattern film 21 and the continuously photographing time interval ($\Delta t$) should also be taken into account to determine the width of each section of the multiple striped patterns forming the relevant pattern film 21.

Figure 7:
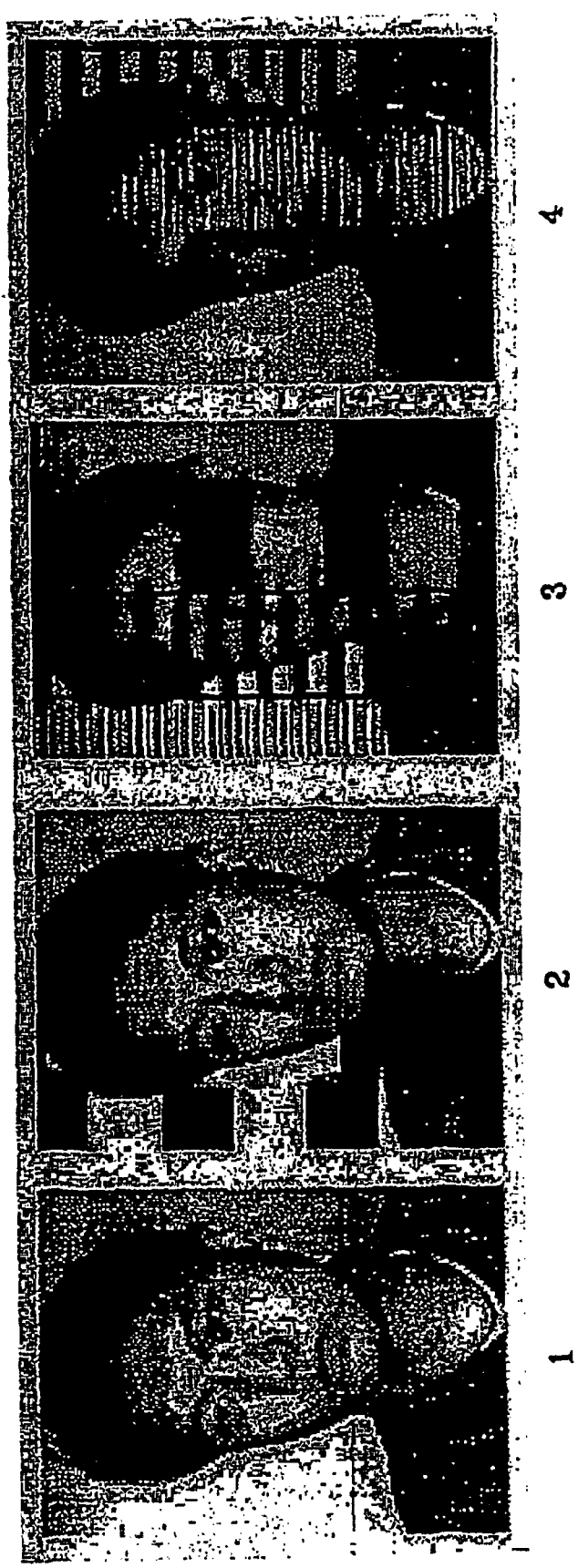
FIG. 7 illustrates images photographed with a very small width in each of the multiple striped patterns that construct a pattern film, including areas that generate no reflection from part of the pattern film.

If the width of each section of multiple striped patterns forming the pattern film 21 is too small, if the transporting speed of the relevant pattern film 21 is too high or if the time interval is too long, (in other words, if the projected image is photographed too slowly), there happens to be an area where part of the pattern film 21 may not be projected onto some areas of the object 10 as shown in FIG. 7.

Therefore, in the three-dimensional measurement apparatus using the multiple striped patterns of the present invention, if an image is photographed by projecting all the areas of the object 10 more than once while each section forming the pattern film 21 is being transported, a relationship shown below in math formula 1 should be maintained.

$$D > Dm (= \Delta t \times v)$$ Math formula 1 where, D indicates the width of sections of the multiple striped patterns forming the pattern film 21, Dm indicates the transported distance of the pattern film 21.

For instance, if the photographs are taken twenty times per second, and the transporting speed (v) of the pattern film 21 is assumed to be '100 mm/sec,'the section of each of the multiple striped patterns forming the relevant pattern film 21 is determined by formula 1 (($\frac{1}{20}$) sec×100 mm/sec) to be larger than 5 mm. Assumed the relevant pattern film 21 has 10 multiple striped patterns (sections), the total length of the pattern film 21 needs to be longer than '50 mm', if using the striped sections. It can be known that a very short pattern film 21 is used, much shorter than the one used in the prior art (that is, the required length of the pattern film is 350 mm.).

However, if the shutter speed ($\Delta$ts) of the camera (that is, a photographing unit) forming the photographing means 24 is too low, and if the transporting speed (v) of the pattern film 21 is too high, there may be a phenomenon called a motion blur in which the striped patterns of borders may be unclear in the projected image. In order to make striped patterns of the borders clear in the projected image, it is preferable that the width of each multiple striped pattern section of the pattern film 21 should be a little larger than the one estimated by math formula 1.

If a description is made in further detail, the width (Db) of the section where the motion blur occurs at the projected image can be estimated by math formula 2 as follows:

$$Db = \Delta ts \times v$$ Math formula 2

Therefore, in the three-dimensional measurement apparatus using the multiple striped patterns, in order to obtain clear striped patterns at all the sections of the image where a plurality of the multiple striped pattern sections are simultaneously projected, the width (Db) of the section where the motion blur happens and the transporting distance (Dm) of the pattern film 21 are considered to determine the width (D) of one section of the multiple striped patterns forming the pattern film 21, as shown below in math formula 3.

$$D > Dm + Db$$ Math formula 3

If the pattern film 21 having a plurality of multiple striped patterns determined by math formula 3 is used, there may be the following advantages. First of all, as the transporting distance of the multiple striped patterns forming the pattern film 21 is short, the whole size, weight and manufacturing cost of the three-dimensional measurement apparatus can be drastically cut down, and the transporting distance of the relevant pattern film 21 is short, it becomes possible to cut short the entire measurement time (that is, photographing time).

Also, since the pattern film 21 of the present invention is transported more precisely than the typical long one (that is, a pattern film formed with a plurality of single striped patterns), a precise measurement result can be obtained. For instance, if the forward proceeding precision is kept in '20 $\mu$m' in the transportation of the pattern film 21, the proceeding precision can be more easily kept in the pattern film 21 of '50 mm' of the present invention than in that of '350 mm' of the prior art.

Figure 8:
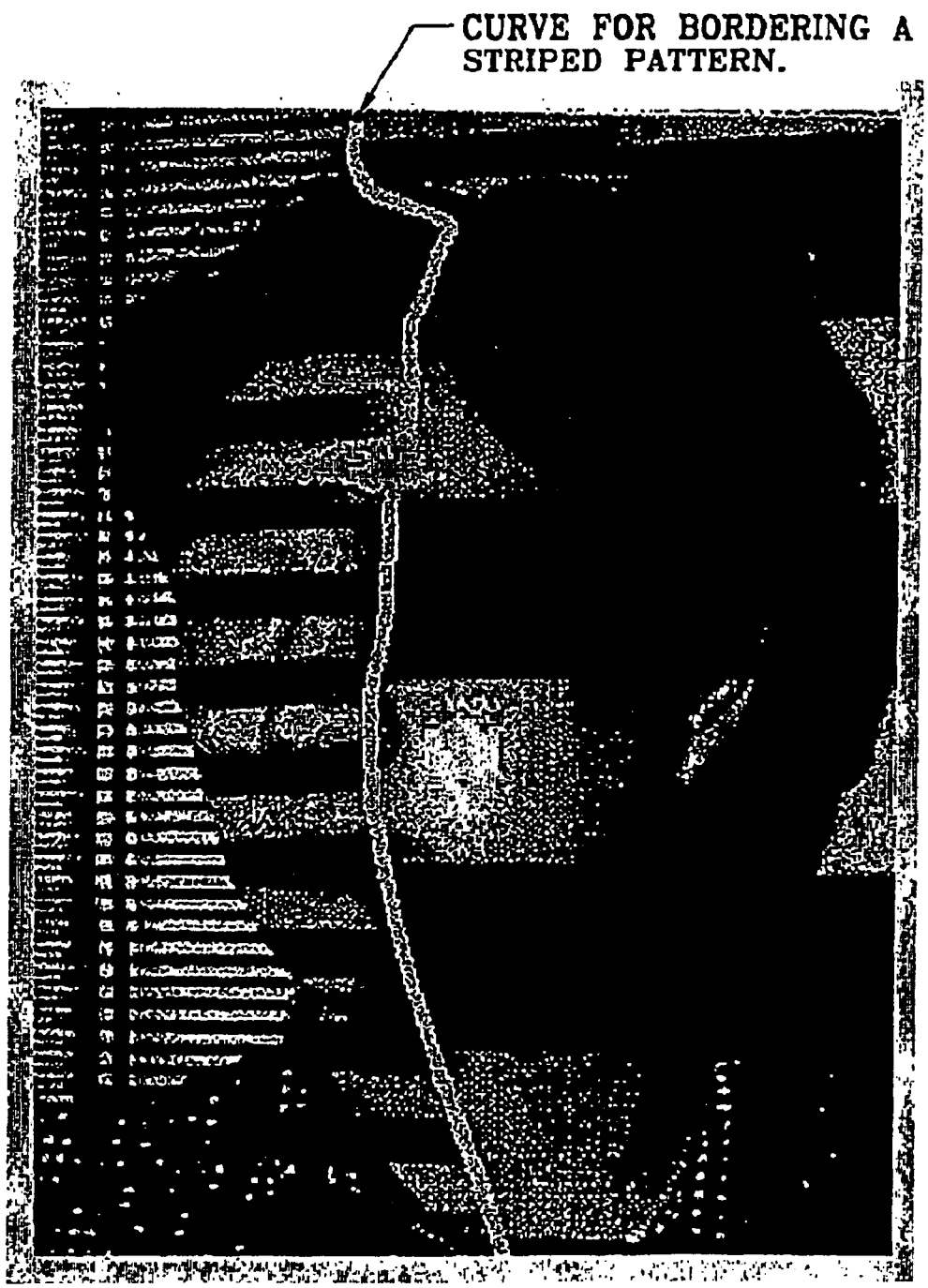
FIG. 8 is an image photographed when the projecting and photographing tools are in the wrong arrangement, illustrating the border of the multiple striped patterns with a curve.
Figure 9:
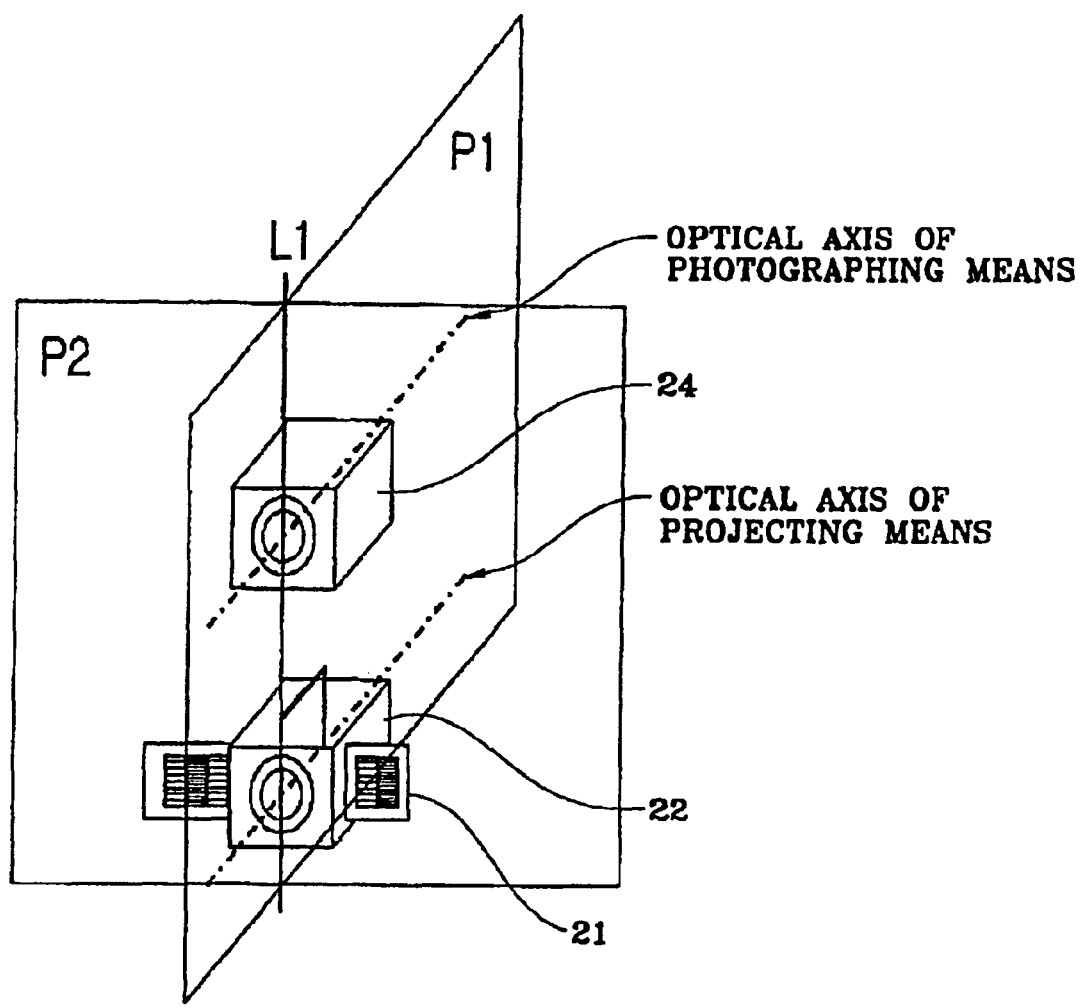
FIG. 9 illustrates mutual positions of the projecting and photographing tools of the present invention to prevent a phenomenon in which the border of each striped pattern is illustrated in a curve as shown in FIG. 8.

On the other hand, as shown in FIG. 6, the border of each striped section is known to be a straight line in the pattern film 21. However, even if the border of each striped pattern section is a single straight line in the pattern film 21, the border of each striped pattern section is illustrated with a curve in the image when it is projected to a three-dimensional object 10 as shown in FIG. 8. If a wrong arrangement of the projecting and photographing means results in a curve border of each striped pattern section in the photographed image, it gets difficult to presume an image photographed by projecting a single striped pattern as shown in FIG. 3.

Therefore, in the three-dimensional measurement apparatus using multiple striped patterns of the present invention, in order to prevent a phenomenon that the border of each striped pattern section is illustrated as a curve in the photographed image, the optical axis of a camera forming the photographing means 24 and that of a projector forming the projecting means 22 are positioned on a plane (P1) in perpendicular to the multiple striped patterns of the pattern film 21, and a line (L1) connecting the center of a camera lens of the photographing means 24 and that of a projector lens of the projecting means 22 is positioned in parallel to a plane (P2) where the pattern film 21 is positioned.

In addition, a method of presuming images photographed by projecting a single striped pattern, as shown in FIG. 3, on the basis of mages photographed by projecting multiple striped patterns, as shown in FIG. 6, includes further steps of: extracting out borders between respective striped pattern sections of all the photographed images to classify the image into pieces; selecting some image pieces relevant to identical striped pattern sections among the classified image pieces according to transporting direction of the pattern film 21; and combining the selectively classified image pieces to presume an image that may be photographed by projecting a single striped pattern.

There are methods of extracting out borders between respective striped pattern sections out of all the photographed images to classify the image into pieces, in other words, one to find out borders between striped pattern sections out of all the photographed images by using physical figures and the other to respectively compare continuous images. Respective embodiments of the present invention will be described below.

At first, the former method of extracting out borders between respective striped pattern sections by using physical figures such as transporting speed (v) of pattern film 21, time interval ($\Delta$t) between continuous photographs, width (D) of each section of multiple striped patterns forming a relevant pattern film 21, magnification (Sp) of projecting means 22 and magnification (Sc) of photographing means 24. The method of extracting out the following border with reference to the first border in each image is carried out by using math formula 4 below.

$$B(i,j+1) = B(i,j) + D \times Sp/Sc$$ Math formula 4 where, 'B(i,j+1)' and 'B(i,j)' respectively designate a position of a j+1th border and a position of a jth border in the ith image.

Also, an identical border position of the continuous images can be extracted by using the following math formula 5, where 'B(i+1, j)' designates a position of a jth border in the i+1th image.

$$B(i+1,j) = B(i,j) + (\Delta t \times v) \times Sp/Sc$$ Math formula 5

Figure 10:
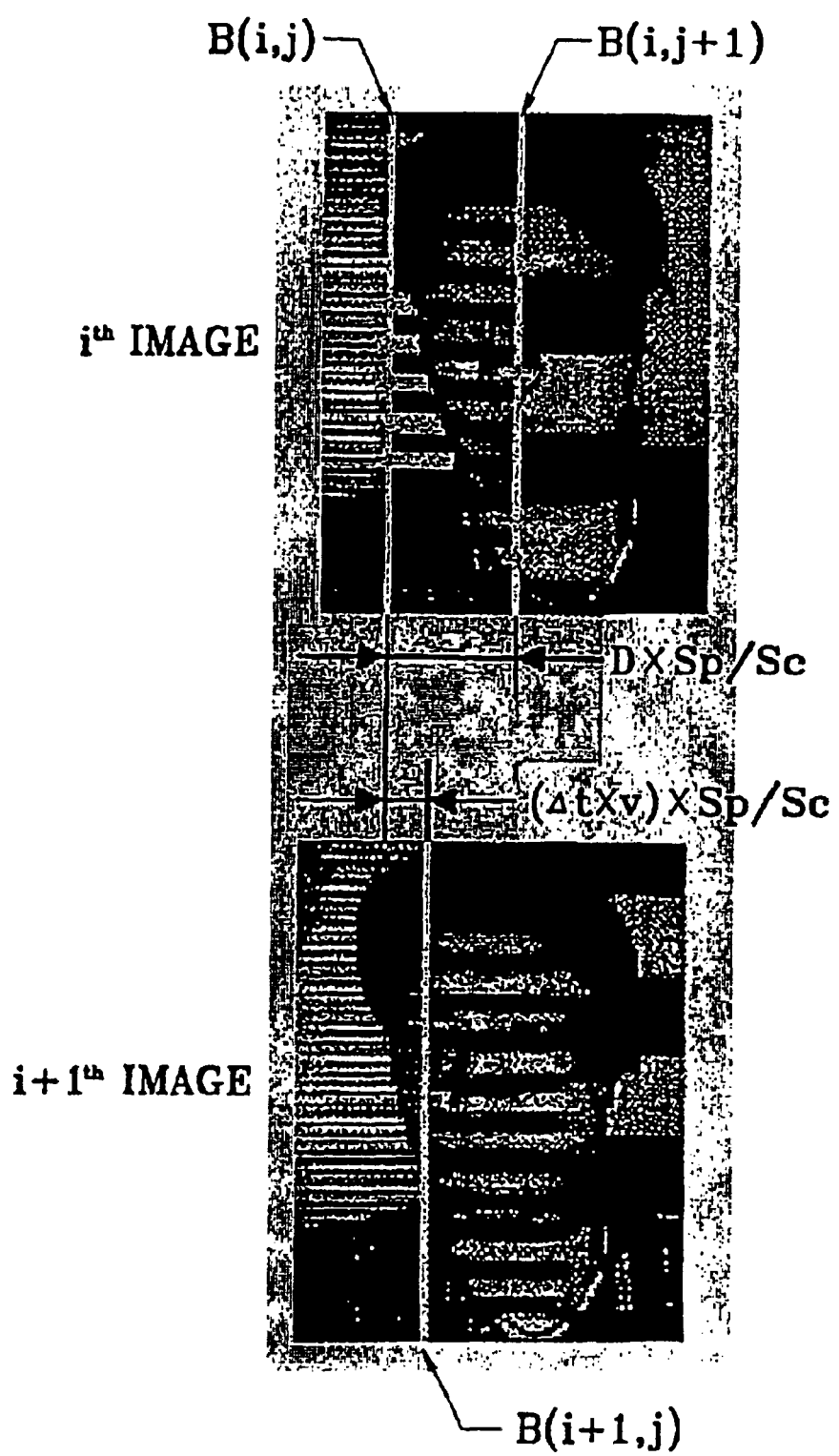
FIG. 10 illustrates the relationship of a border between respective striped patterns extracted with physical figures in the present invention.

Furthermore, the relationship of borders between respective striped pattern sections extracted by math formulas 4 and 5 described above can be illustrated in FIG. 10.

Figure 11:
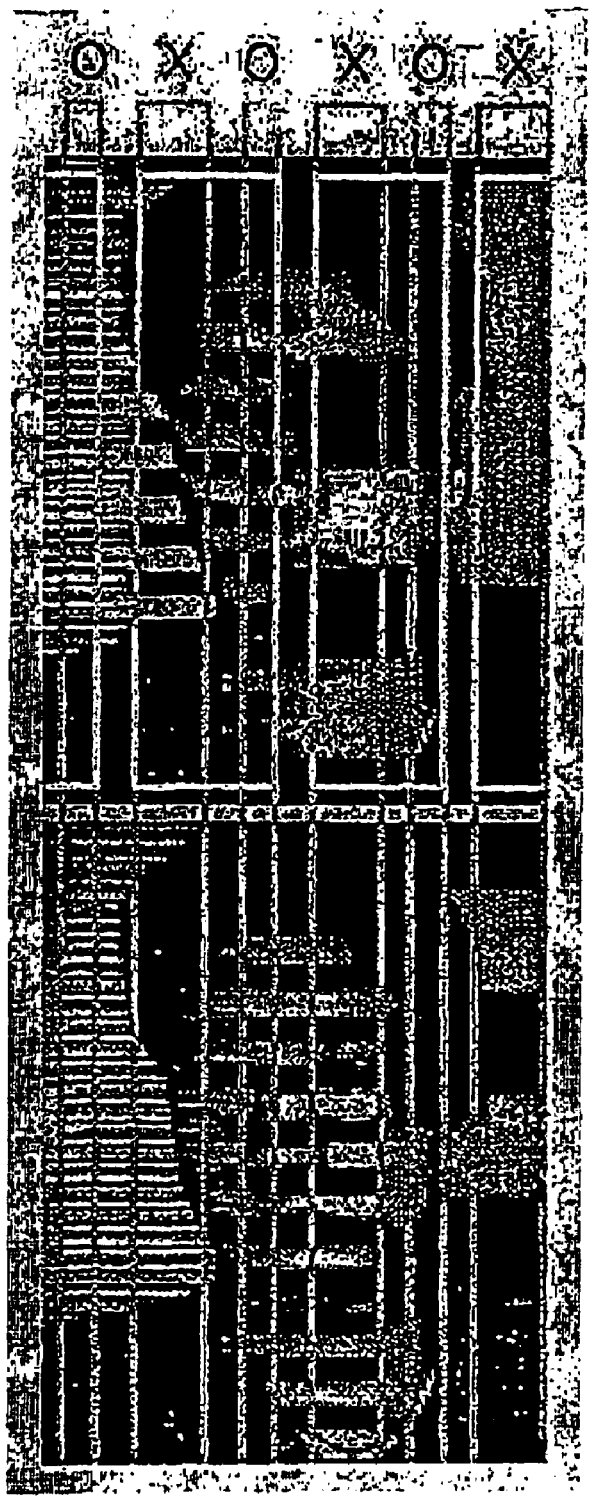
FIG. 11 illustrates a method of extracting a border between respective striped patterns by comparing continuous images in the present invention.

Next, if it is difficult to extract out the border between respective striped pattern sections by using the aforementioned physical figures (that is, math formulas 4 and 5), the continuous images are compared to extract out borders between respective striped pattern sections. If striped patterns at one vertical line of each section are compared in two continuous images (ith and i+1th images) as shown in FIG. 11, they can be classified into sections (sections O and X) respectively having identical and different images and a motion blur section between those two sections. The border between the multiple striped patterns at the ith image is found at a place where 'section O' turns to 'section X' along the direction of transporting the pattern film 21, thereby making it possible to extract relevant borders between respective striped pattern sections.

In other words, brightness and color data of one image (ith image) and those of the following image (i+1th image) are compared at an identical section while being transported in perpendicular to the striped pattern of a reference image (ith image) among two continuous images, thereby making it possible to extract out the border between respective striped pattern sections.

Furthermore, as described above, physical figures are used or continuous images are compared to extract out the border between respective striped pattern sections. When images are divided into pieces with reference to the extracted border, it becomes possible to classify the image pieces according to respective striped pattern sections. For conveniences of the following descriptions, the front and rear image pieces relating to the respective striped pattern sections will be respectively referred to as front and rear parts according to the proceeding direction of the pattern film 21.

Secondly, the process of selecting image pieces relating to an identical striped pattern section out of all the image pieces classified from the aforementioned steps will be described with reference to FIG. 12.

Figure 12:
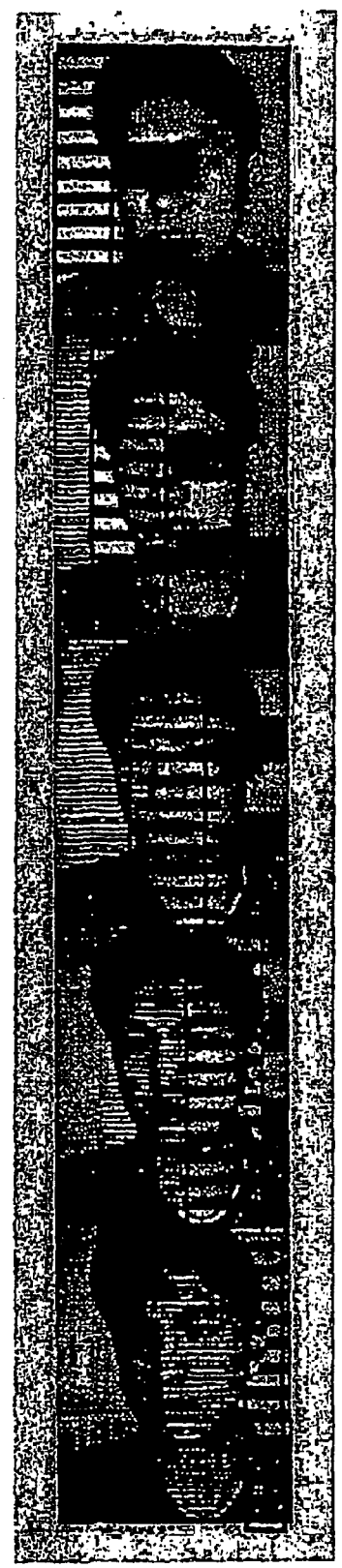
FIG. 12 illustrates processes of selecting image pieces relevant to the identical striped patterns in the present invention.

In other words, as shown in FIG. 12, in the continuous images relative to one image piece, all the other continuous image pieces falling into a section overlapping with the front part of the first image piece are selected as image pieces relating to an identical striped pattern section.

Figure 13:
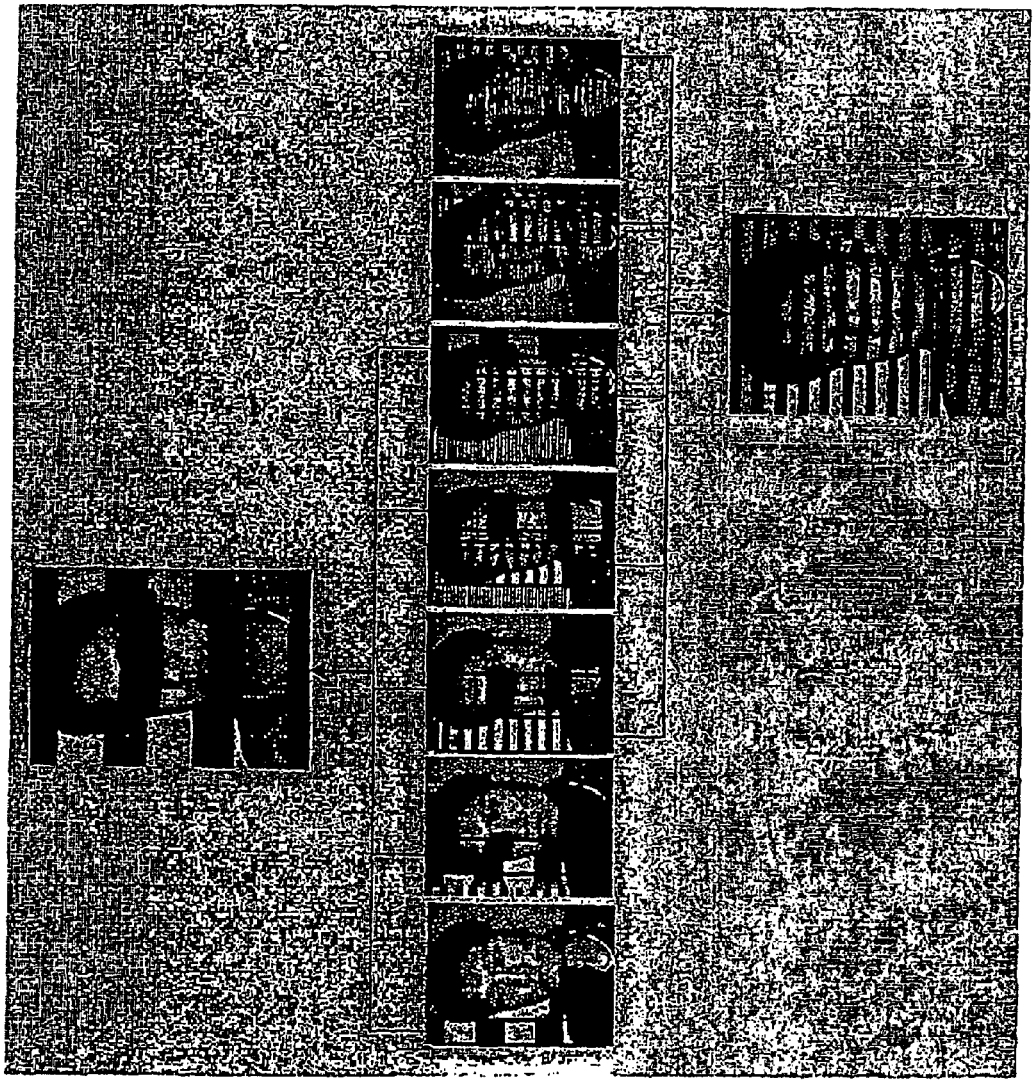
FIG. 13 illustrates processes of combining image pieces selected in FIG. 12 to obtain an image photographed by projecting a single striped pattern.

Thirdly, the process of combining the image pieces selected as those relating to the identical striped pattern section to presume an image photographed by projecting a single striped pattern will be described with reference to FIG. 13.

In other words, the image pieces falling into an identically selected striped pattern section are combined to presume an image photographed by projecting a single striped pattern. When the relevant image pieces are combined, the image pieces are combined at a predetermined image with their image coordinates being kept identical. In order to eliminate the motion blur, a mid-section of the image piece, not a border section of the image piece, is taken for a section overlapping between respective image pieces.

Furthermore, after the relevant operating unit 26 presumes an image photographed by projecting a single striped pattern, the relevant presumed images are combined to obtain three-dimensional shape information on the object 10.

Figure 14:
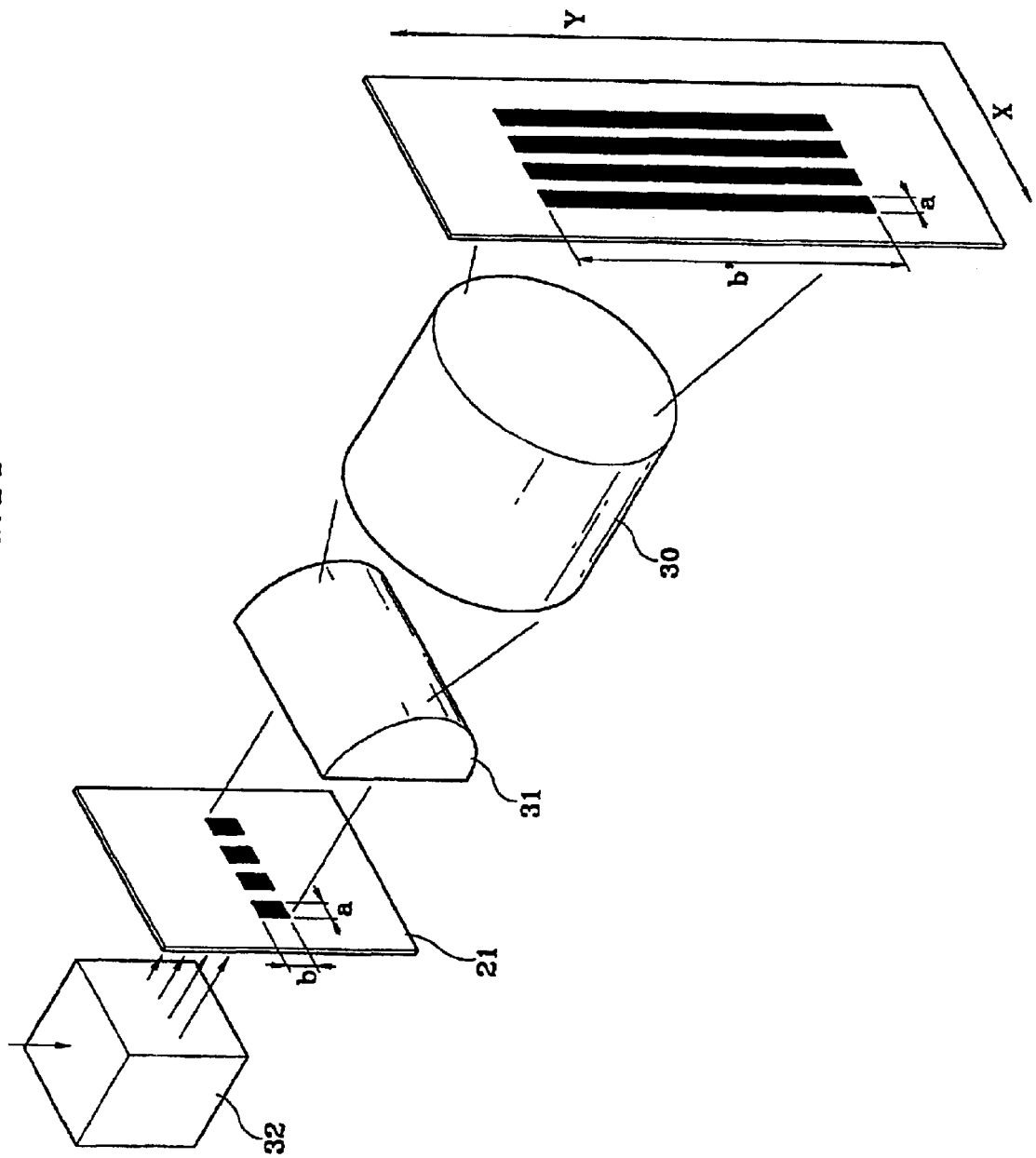
FIG. 14 illustrates the arrangement of a cylinder lens between a lens of the projecting section and the pattern film in the three-dimensional measurement apparatus shown in FIG. 4.

Finally, FIG. 14 illustrates the arrangement structure of a cylinder lens 31 between projecting lens 30 of the projecting means 22 and pattern film 21 in the three-dimensional apparatus shown in FIG. 4. Since the cylinder lens 31 is known to enlarge an image to a radius direction of its convex surface, the cylinder lens 31 is in arrangement as shown in FIG. 14. As a result, a pattern image passing through the pattern film 21 proceeds sequentially through the left flat surface and right convex surface of the cylinder lens 31 to make the pattern film longer to a Y-axis direction of the drawing. In other words, while the length a of an X-axis of one section of the pattern film is actually maintained as it is, only the length b of its Y-axis is to increase to b'.

Therefore, if the cylinder lens 31 is arranged between the pattern film 21 and projecting lens 30, the length of the Y-axis direction of the pattern film 21 will be significantly shorter. As a result, it is possible to manufacture a pattern film 21 smaller, which means that the three-dimensional measurement apparatus gets much smaller.

Besides, even if not shown in FIG. 14, it is possible that another cylinder lens having a symmetrical shape to the cylinder lens 31 can be additionally arranged between the optical source 32 and pattern film 21. With the additional cylinder lens, it would be possible to concentrate light onto the pattern film 21 and increase light density reaching the pattern film 21, thereby making the finally projected striped patterns more clear.

On the other hand, in order to explain the concept of the present invention, descriptions have been made on the processes of obtaining three-dimensional shape information by presuming from the whole image relating to an image to be photographed by projecting a single striped pattern with reference to the aforementioned embodiment of the present invention. In another embodiment of the present invention, it is possible to obtain the three-dimensional shape information without presuming from the whole image relating to an image to be photographed by projecting a single striped pattern. For instance, the three-dimensional shape information can also be obtained by presuming an image photographed by dividing the image into several sections and projecting a single striped pattern to all the sections.

In addition, three-dimensional shape information can also be obtained by taking out brightness and color data of an image divided into a unit of pixel and projecting other striped patterns to the pixels of the image. In this method, it is possible to more accurately presume an entire image photographed by projecting a single striped pattern.

Moreover, having described about the preferred embodiment and operational effects of the present invention, it is to be understood that the invention is not limited to those precise embodiments, and that various changes and modifications may be effected therein by one skilled in the art without departing from the scope or spirit of the invention as defined in the appended claims.

As described above, there are advantages in a three-dimensional measurement apparatus using multiple striped patterns and a method thereof in that a three-dimensional measurement is taken by projecting and transporting the multiple striped patterns having a plurality of stripes, not a single striped pattern that is projected once to the entire area of an object, according to a striped pattern shape, thereby making a faster and more precise three-dimensional measurement and cutting down the entire size, weight and manufacturing cost of the relevant three-dimensional measurement apparatus and, at the same time, a measurement time.

In addition, the cylinder lens is arranged between projecting lens of a projecting tool and pattern film to get the pattern film manufactured with a smaller vertical length for a further miniature three-dimensional measurement apparatus, and another cylinder lens with a symmetrical shape to the cylinder lens is arranged between the light source of the projecting tool and the pattern film to obtain a clearer projection of the striped patterns.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. An apparatus for measuring a three-dimensional shape of an object, the apparatus comprising:
    a pattern film containing a plurality of striped patterns, wherein the striped patterns are formed in at least one of longitudinal and latitudinal directions;
    a projecting section configured to project a plurality of striped patterns onto an object to be measured;
    a transporting section configured to move the pattern film along the at least one of the longitudinal and latitudinal directions such that the projecting section sequentially projects the pattern film onto the object;
    a photographing section configured to photograph the object with at least two of the plurality of striped patterns being simultaneously projected thereon; and
    an operational unit configured to estimate images of the object from the photographed images so as to obtain three-dimensional shape information for the object.

2. The apparatus of claim 1, wherein the operational unit is configured to determine borders between each of the plurality of striped patterns included in the photographed image so as to classify the image into pieces, to select image pieces having identical striped patterns from the classified image pieces, and to combine the selected image pieces so as to estimate an image that would be generated by projecting a single striped pattern onto the object.

3. The apparatus of claim 1, wherein the photographing section is positioned at the top or bottom of the projecting section, and the optical axes of the projecting section and the photographing section are positioned perpendicular to a plane where the pattern film is positioned.

4. The apparatus of claim 3, wherein a straight line connecting the centers of the projecting section and the photographing section is positioned parallel to a plane formed by the pattern film.

5. The apparatus of claim 1, wherein the width of two adjacent striped patterns is less than an entire projected area of the object, and greater than the distance of the pattern film to be transported by the transporting section, the distance being defined as the value resulting from multiplication of a pattern film transporting speed of the transporting section and continuous photographing time interval of the photographing section.

6. The apparatus of claim 5, wherein the width of two adjacent striped patterns is less than an entire projected area of the object, but greater than a resultant value obtained by adding a transportation distance of the pattern film and the value resulting from multiplication of a shutter speed of the photographing section and a transporting speed of the pattern film.

7. The apparatus of claim 1, wherein the width of two adjacent striped patterns is less than an entire projected area of the object, but greater than a resultant value obtained by adding a transportation distance of the pattern film and the value resulting from multiplication of a shutter speed of the photographing section and a transporting speed of the pattern film.

8. The apparatus of claim 1, further comprising a control unit configured to control the projecting section, the transporting section and the photographing section.

9. The apparatus of claim 1, wherein the projecting section includes a light source and a projecting lens arranged in front of and in the back of the pattern film, respectively, and further comprising a first cylinder lens which is arranged between the pattern film and the projecting lens so as to enlarge the image projected from the pattern film.

10. The apparatus of claim 9, further comprising a second cylinder lens arranged symmetrically to the first cylinder lens with respect to the pattern film and being arranged between the light source and the pattern film.

11. A method of measuring a three-dimensional shape of an object, the method comprising:
    transporting a pattern film containing a plurality of striped patterns, formed in at least one of longitudinal and latitudinal directions, along the at least one direction;
    projecting the pattern film onto an object;
    photographing the object, on which at least two of the plurality of striped patterns have been simultaneously projected; and
    estimating images of the object, which would be obtained by projecting a plurality of single striped patterns onto the object, from the photographed images so as to obtain three-dimensional shape information.

12. The method of claim 11, wherein the transportation distance of the pattern film at one photographing shot is less than the width of one of the plurality of striped patterns, and wherein the transportation speed of the pattern film is less than the result obtained by having the width of one of the plurality of striped patterns divided by a value, the value being obtained by adding a continuous photographing time interval and a shutter speed of the photographing section.

13. The method of claim 11, wherein the estimating comprises:
    determining borders between each of the plurality of striped patterns of the photographed images so as to classify each image into pieces;
    selecting image pieces having identical striped patterns from the classified image pieces; and
    combining the selected image pieces to estimate an image that would be generated by projecting a single striped pattern onto the object.

14. The method of claim 13, wherein the determining comprises extracting borders between each of the plurality of striped patterns by using a formula as follows:

$$B(i,j+1)=B(ij)+D\times Sp/Sc$$

$$B(i+1,j)=B(ij)\times(\Delta t\times v)\times Sp/Sc$$

where,

B(i,j+1) designates a position of aj+1th border in the ith image,

B(i,j) a position of a jth border in the ith image,

D the width of each of the plurality of striped patterns in the pattern film,

Sp a projecting magnification,

Sc a photographing magnification,

B(i+1,j) designates a position of ajth border in the i+1th image,

Δt a continuous photographing time interval and v a pattern film transporting speed.

15. The method of claim 13, wherein the determining comprises extracting borders between each of the plurality of striped patterns by comparing brightness and color data of one area with those of the following area while being transported perpendicular to the striped pattern of a reference image selected from the images sequentially photographed at a predetermined time interval.

16. The method of claim 13, wherein the combining comprises selecting and combining areas that are located on center portions of respective image pieces, with the respective image pieces maintaining the same coordinate system, so as to eliminate a motion blurring phenomenon.

17. An apparatus for measuring a three-dimensional shape of an object, the apparatus comprising:

means for transporting a pattern film containing a plurality of striped patterns, formed in at least one of longitudinal and latitudinal directions, along the at least one direction;

means for projecting the pattern film onto an object;

means for photographing the object, on which at least two of the plurality of striped patterns have been simultaneously projected; and means for estimating images of the object, which would be obtained by projecting a single striped pattern onto the object, from the photographed images so as to obtain three-dimensional shape information.

* * * * *

UNITED STATES PATENT AND TRADEMARK OFFICE
CERTIFICATE OF CORRECTION

PATENT NO. : 6,914,685 B2
DATED : July 5, 2005
INVENTOR(S) : Chang

It is certified that error appears in the above-identified patent and that said Letters Patent is hereby corrected as shown below:

Column 12,
Lines 50-51, delete
"$B(i,j+1)=B(ij)+D \times Sp/Sc$
$B(i+1,j)=B(ij)+(\Delta t \times v) \times Sp/Sc$".
and insert,
-- $B(i,j+1)=B(i,j)+D \times Sp/Sc$
$B(i+1,j)=B(i,j)+(\Delta t \times v) \times Sp/Sc$ --.

Column 12,
Line 54, delete "aj+1th" and insert -- a j+1th --.
Line 62, delete "ajth" and insert -- a jth --.

Signed and Sealed this

Fourteenth Day of February, 2006

JON W. DUDAS
*Director of the United States Patent and Trademark Office*